(12) United States Patent
Tsushima et al.

(10) Patent No.: US 12,484,563 B2
(45) Date of Patent: Dec. 2, 2025

(54) FISHING REEL

(71) Applicant: GLOBERIDE, Inc., Tokyo (JP)

(72) Inventors: Daisuke Tsushima, Tokyo (JP);
Hironori Horie, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 350 days.

(21) Appl. No.: 18/113,425

(22) Filed: Feb. 23, 2023

(65) Prior Publication Data

US 2023/0309526 A1 Oct. 5, 2023

(30) Foreign Application Priority Data

Mar. 31, 2022 (JP) .................................. 2022-057880

(51) Int. Cl.
*A01K 89/01* (2006.01)
(52) U.S. Cl.
CPC .... *A01K 89/0117* (2013.01); *A01K 89/01121* (2015.05)
(58) Field of Classification Search
CPC .......... A01K 89/0111; A01K 89/01121; A01K 89/0117; A01K 89/0155; A01K 89/0186; A01K 89/01; A01K 89/015; A01K 89/01903; A01K 89/027; A01K 89/052–053
See application file for complete search history.

(56) References Cited

U.S. PATENT DOCUMENTS

| | | |
|---|---|---|
| 5,370,330 A | 12/1994 | Uehara et al. |
| 5,927,630 A | 7/1999 | Katayama |
| 6,050,512 A | 4/2000 | Jung |
| 6,457,662 B1 * | 10/2002 | Sato ............... A01K 89/011221 242/321 |
| 6,598,819 B2 * | 7/2003 | Furomoto ............ A01K 89/027 242/246 |
| 8,382,022 B2 * | 2/2013 | Shibata .......... A01K 89/011221 242/247 |
| 10,506,802 B2 * | 12/2019 | Horie ................. A01K 89/0117 |
| 2003/0146321 A1 | 8/2003 | Chang |

FOREIGN PATENT DOCUMENTS

JP  2003265078 A  *  9/2003

OTHER PUBLICATIONS

Sep. 18, 2023 Extended Search Report issued in European Patent Application No. 23155200.1.

(Continued)

*Primary Examiner* — Anna M Momper
(74) *Attorney, Agent, or Firm* — Oliff PLC

(57) ABSTRACT

A fishing reel according to the present disclosure has a one-way clutch that is disposed on a drive shaft and has an inner ring, an outer ring, and a holder holding a plurality of rolling members, and a cylindrical portion that is provided on a reel body and accommodates the one-way clutch. The outer ring is provided with a stopper protruding radially outward, a circumferential wall of the cylindrical portion is provided with a notch portion which penetrates the circumferential wall in a radial direction and in which the stopper is disposed, and an anticorrosion plate comprising a leg portion interposed between the stopper and the notch portion is disposed to overlap the one-way clutch in an axial direction.

6 Claims, 8 Drawing Sheets

(56) References Cited

OTHER PUBLICATIONS

Apr. 17, 2024 Examination Report issued in Australian Patent Application No. 2023200625.
Jun. 20, 2024 extended Search Report issued in European Patent Application No. 24169533.7.
Aug. 12, 2025 Office Action issued in Australian Application No. 2024227510.
Oct. 9, 2025 Extended European Search Report issued in European Patent Application No. 25166761.4.

* cited by examiner

FISHING REEL

CROSS-REFERENCE TO RELATED APPLICATION

This application claims priority under 35 U.S.C. § 119 to Japanese Patent Application No. 2022-057880 filed on Mar. 31, 2022 in the Japanese Patent Office, the entire contents of which is hereby incorporated by reference.

FIELD

The present disclosure relates to a fishing reel, and more particularly to a fishing reel incorporating a one-way clutch that prevents reverse rotation of a drive shaft.

BACKGROUND

Generally, a spinning reel, which is a fishing reel, incorporates a reverse rotation prevention mechanism that allows rotation of a rotor in a fishing line winding direction by a rotation operation of a handle and prevents reverse rotation of the rotor when the handle is to be reversely rotated. Normally, as disclosed in JP 2003-265078 A, for example, the reverse rotation prevention mechanism is constituted by a one-way clutch including an inner ring fitted into a pinion gear to prevent rotation, a holder disposed radially outside the inner ring and holding a plurality of rolling members, and an outer ring disposed radially outside the holder and fixed to a reel body to prevent rotation.

Since the one-way clutch has a configuration in which an outer ring portion is fitted into a cylindrical portion formed in the reel body, there is a problem that both the portions are in a contact state and corrosion (electrolytic corrosion) is likely to occur due to a difference in potential differences due to different materials. Therefore, JP 2003-265078 A discloses a configuration in which a substantially cup-shaped protective cover that covers an outer ring member is disposed between the outer ring and the reel body.

SUMMARY

Since the above-described protective cover is configured to be interposed between an inner peripheral surface of the cylindrical portion of the reel body and an outer peripheral surface of the outer ring radially outside the outer ring, there is a limit to miniaturization and weight reduction, and there is room for improvement.

The present disclosure has been made in view of the above problems, and an object thereof is to provide a structure capable of preventing corrosion of a portion where a one-way clutch is disposed and reducing a size and a weight of a reel body, in a fishing reel incorporating the one-way clutch.

In order to achieve the above object, a fishing reel according to the present disclosure has a drive shaft that is rotationally driven by a rotation operation of a handle rotatably supported on a reel body, a one-way clutch that is disposed on the drive shaft and has an inner ring, an outer ring, and a holder holding a plurality of rolling members, and a cylindrical portion that is provided on the reel body and accommodates the one-way clutch. The outer ring is provided with a stopper protruding radially outward, a circumferential wall of the cylindrical portion is provided with a notch portion which penetrates the circumferential wall in a radial direction and in which the stopper is disposed, and an anticorrosion plate comprising a leg portion interposed between the stopper and the notch portion is disposed to overlap the one-way clutch in an axial direction.

According to the fishing reel described above, the circumferential wall of the cylindrical portion provided in the reel body is provided with the notch portion penetrating the circumferential wall in the radial direction, and the stopper of the outer ring is disposed in the notch portion so as to be exposed in the radial direction and fixes the outer ring to prevent rotation. As described above, since the configuration where the outer ring of the one-way clutch is fixed on the radially inner peripheral side of the cylindrical portion of the reel body to prevent rotation is not used, the cylindrical portion can be reduced in diameter as much as possible, and the reel body can be reduced in size and weight. In addition, even if the cylindrical portion of the reel body and the outer ring of the one-way clutch are made of different materials, the anticorrosion plate is disposed at contact places between both the members (contact places between the stopper and the notch portion), so that corrosion of the reel body and the one-way clutch can be prevented.

A fishing reel according to the present disclosure has a drive shaft that is rotationally driven by a rotation operation of a handle rotatably supported on a reel body, and a one-way clutch that is disposed on the drive shaft and has an inner ring, an outer ring, and a holder holding a plurality of rolling members. The outer ring is provided with a stopper protruding radially outward, the reel body is provided with an abutting portion that abuts on the outer ring at two points on both side surfaces of the stopper to restrict rotation of the outer ring, and an anticorrosion plate comprising a leg portion interposed between the stopper and an abutment portion of the abutting portion is disposed to overlap the one-way clutch in an axial direction.

According to the fishing reel described above, the stopper is formed on the outer ring of the one-way clutch to protrude radially, and the reel body is provided with the abutting portion that abuts on the outer ring at the two points on the side surfaces of the stopper to restrict the rotation of the outer ring. Therefore, it is possible to simplify the structure of the portion for fixing the outer ring to prevent the rotation. As a result, it is possible to reduce the size and the weight of the reel body. In addition, even if the abutting portion of the reel body and the outer ring of the one-way clutch are made of different materials, the anticorrosion plate is disposed at the contact places between both the members (abutment places at the two points), so that corrosion of the reel body and the one-way clutch can be prevented.

According to a fishing reel of the present disclosure, it is possible to obtain a structure capable of preventing corrosion of a portion where a one-way clutch is disposed and reducing a size and a weight of a reel body.

BRIEF DESCRIPTION OF THE DRAWINGS

FIG. 9 is deleted.

DETAILED DESCRIPTION

Figure 1:
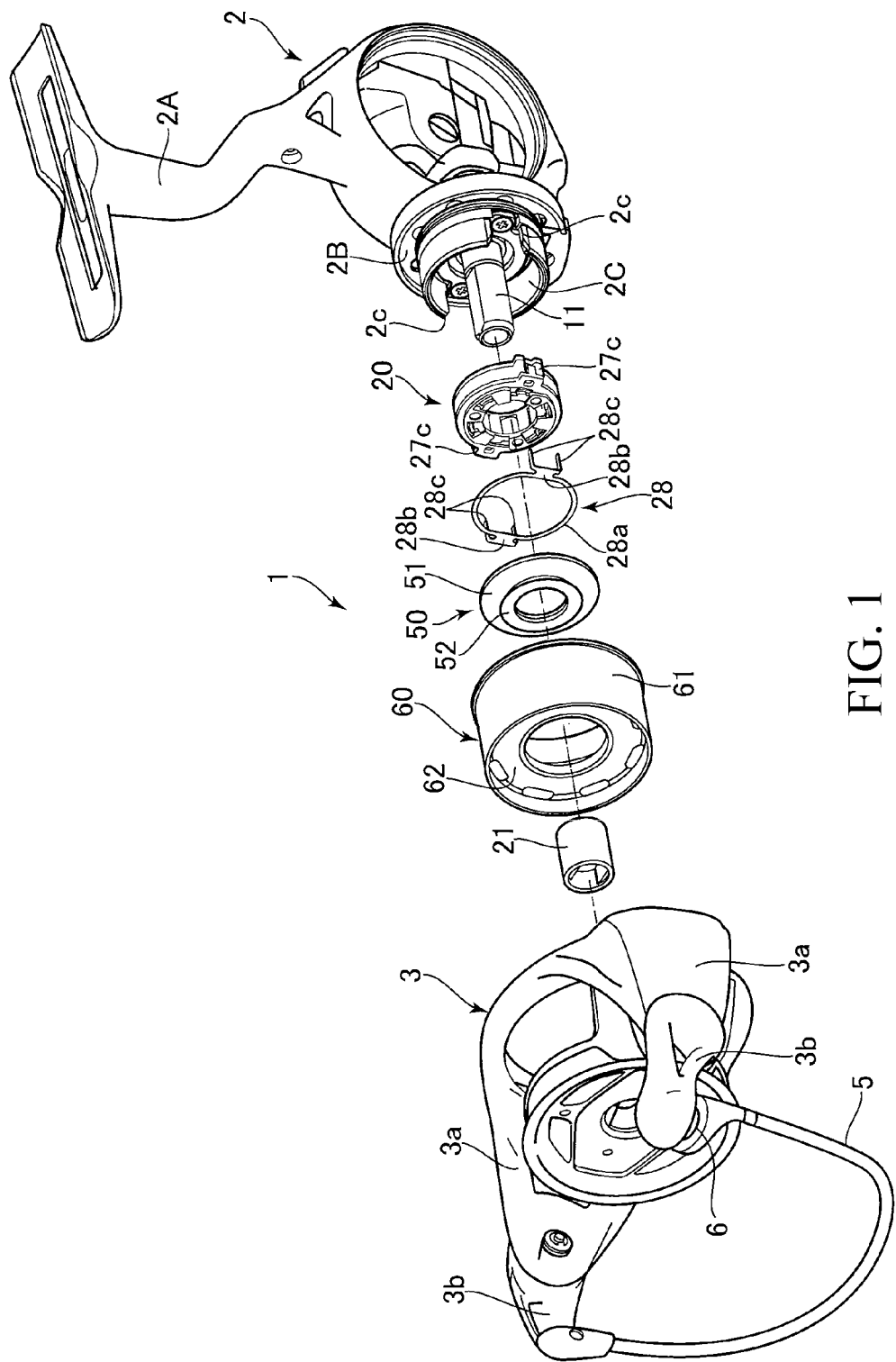
FIG. 1 is an exploded perspective view illustrating a first embodiment of a fishing reel (spinning reel) according to the present disclosure.
Figure 2:
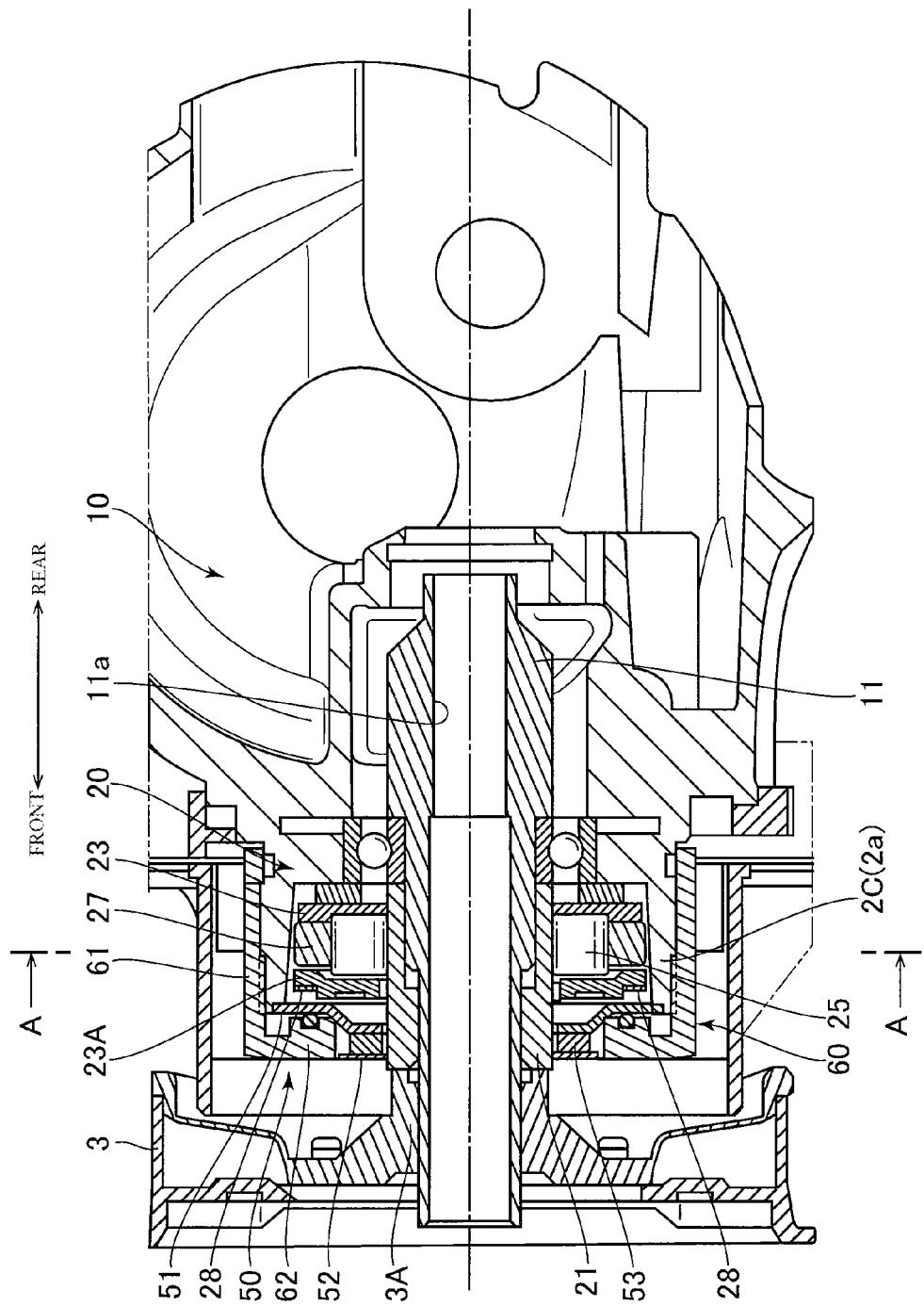
FIG. 2 is an axial cross-sectional view of a main portion of the fishing reel illustrated in FIG. 1.
Figure 3:
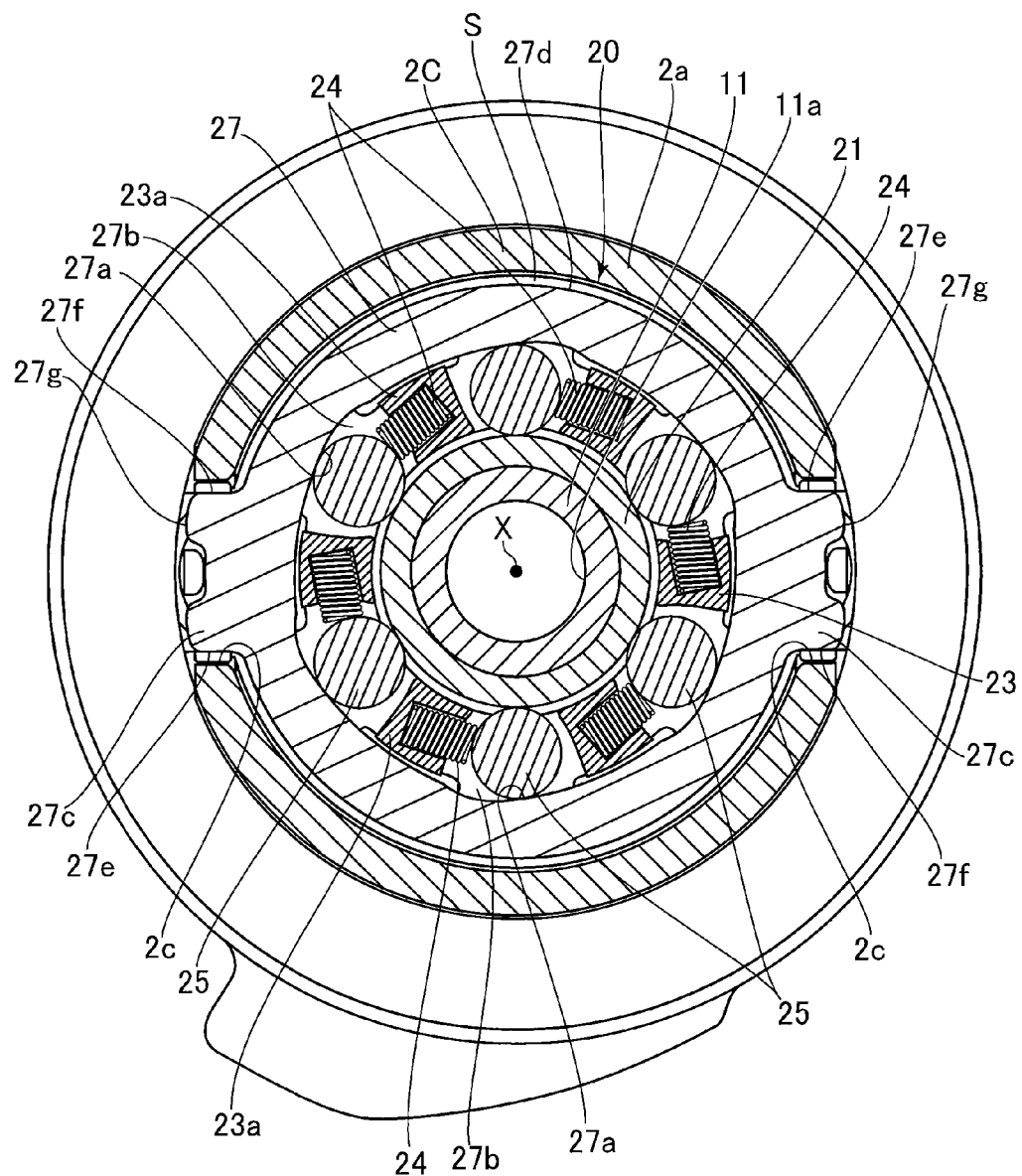
FIG. 3 is a cross-sectional view taken along the line A-A of FIG. 2.
Figure 4:
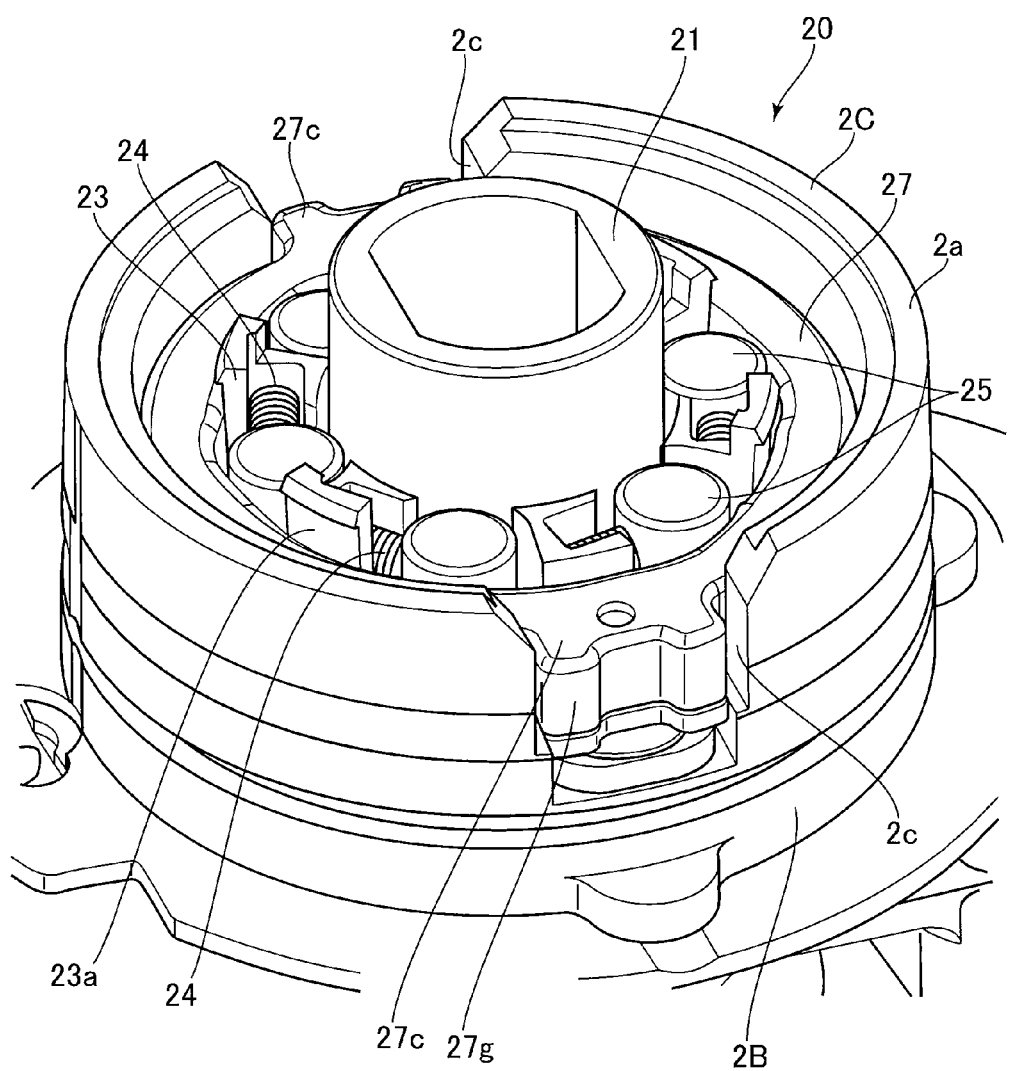
FIG. 4 is a perspective view illustrating a fixed state of a one-way clutch.

FIGS. 1 and 2 are diagrams illustrating a first embodiment of a fishing reel according to the present disclosure (in the present embodiment, a spinning reel is illustrated as the fishing reel). First, an outline of an overall configuration of the spinning reel of the present embodiment will be described. Note that, in the following description, "front and rear" mean directions illustrated in FIG. 2.

A reel leg 2A to be mounted on a fishing rod is formed integrally with a reel body 2 of a spinning reel (hereinafter, referred to as the reel) 1. A rotor 3 that is rotatably supported and a spool (not illustrated in the drawings) that is supported to be movable back and forth in synchronization with the rotational motion of the rotor 3 are disposed in front of the reel body 2.

The rotor 3 comprises a pair of arm portions 3a that rotates around the spool, and a bail support member 3b to which a base end of a bail 5 is attached is rotatably supported at a front end of each arm portion 3a between a fishing line winding position and a fishing line releasing position. In this case, one base end of the bail 5 is attached to a fishing line guide portion (line roller) 6 provided integrally with the bail support member 3b.

In the reel body 2, a handle shaft is rotatably supported via a bearing, and a handle is attached to a protrusion end of the handle shaft. The handle shaft is provided with a driving force transmission mechanism 10 that transmits a driving force to the rotor 3 to rotationally drive the rotor when the handle is rotationally operated.

As known, the driving force transmission mechanism 10 comprises a drive gear integrally rotatably mounted on the handle shaft, and a pinion 11 comprising a pinion tooth portion meshing with the drive gear. The pinion 11 extends in a front-rear direction orthogonal to the handle shaft, and has a function as a rotation drive unit (drive shaft) in which a cavity 11a extending in an axial direction is formed. In this case, a spool shaft that engages with a known oscillating mechanism moving the spool back and forth when the handle is rotationally operated is inserted through the cavity 11a, and the spool is mounted on a distal end thereof.

The pinion 11 is rotatably supported by the reel body 1. Further, the pinion 11 extends toward the spool side, and the rotor 3 is integrally rotatably attached to a distal end of the pinion 11. The rotor 3 is fixed by externally fitting a through-hole of a boss portion 3A formed at a center portion into the distal end of the pinion 11 and tightening a nut (not illustrated in the drawings). A one-way clutch 20 constituting a reverse rotation prevention device is disposed on the pinion 11.

With the above configuration, when the handle is wound, the rotor 3 is rotationally driven via the driving force transmission mechanism 10, and the spool is reciprocated in the front-rear direction via the oscillating mechanism and the spool shaft. Therefore, the fishing line is evenly wound around the spool via the fishing line guide portion 6 of the rotationally driven rotor 3.

Next, the one-way clutch 20 of the present embodiment will be described with reference to FIGS. 1 to 6.

As illustrated in FIG. 1, a base portion 2B formed in a substantially disk shape is disposed on the spool side of the reel body 2, and a cylindrical portion 2C is provided on a surface portion of the base portion 2B in the axial direction. The pinion 11 is rotatably supported through a center portion of the cylindrical portion 2C, and the one-way clutch 20 is disposed in an intermediate portion thereof.

The pinion 11 is rotationally driven via the drive gear by the rotation operation of the handle, and the one-way clutch 20 is disposed in the intermediate portion of the pinion 11 to allow rotation of the pinion 11 in the fishing line winding direction and prevent reverse rotation.

The one-way clutch 20 comprises an inner ring 21, an outer ring 27, and a holder 23 holding a plurality of rolling members 25, and further comprises a cover member 23A integrated with the holder 23. These elements (or some elements) can be unitized in advance.

The inner ring 21 is prevented from rotating with respect to the pinion 11, and has a function as a drive shaft that rotates integrally with the pinion 11. Specifically, a cross section of the pinion 11 has a shape in which a non-circular portion is partially formed, and the inner ring 21 is rotatable integrally with the pinion 11 by fitting the non-circular portion of the inner ring 21 into this portion.

The holder 23 is disposed radially outside the inner ring 21 and comprises holding portions 23a disposed at regular intervals in a circumferential direction. A biasing spring 24 is disposed in each of the holding portions 23a to bias the rolling members 25 disposed between the holding portions in the circumferential direction (in FIG. 3, a counterclockwise direction; a reverse rotation direction).

The outer ring 27 is disposed radially outside the holder 23 and is formed in a substantially ring shape. On an inner peripheral surface of the outer ring 27, a wedge region 27a for blocking the rotation of each rolling member 25 and a free region 27b for freely rotating the rolling member 25 are formed. Each rolling member 25 held by the holder 23 is constantly biased to the side of the wedge region by the biasing spring 24. An outer peripheral surface 27d of the outer ring 27 is formed in a circular shape except for a portion where the following stopper 27c is formed.

A protrusion piece 27c is provided in a part of the outer ring 27 so as to protrude radially outward. The protrusion piece has a function as a stopper that restricts the rotation of the outer ring 27 (hereinafter, referred to as the stopper 27c). The stopper 27c is integrally formed so as to protrude radially outward from the outer peripheral surface 27d of the outer ring 27, and is provided at one or more places. In this case, there is a possibility that a large torque is applied to the outer ring, and stress concentrates at one place to cause a deviation or the like. Therefore, it is preferable to form two or more stoppers at equal intervals. In the present embodiment, two stoppers are provided so as to face each other with a center axis X therebetween at 180° intervals. The stopper 27c has a constant width in the circumferential direction, and both sides 27e and 27f in the circumferential direction have a rotation stopping function.

The cylindrical portion 2C protruding from the reel body 2 is provided with a notch portion 2c penetrating a circumferential wall 2a in the radial direction. The notch portion 2c is formed to such an extent that the stopper 27c of the outer ring 27 can be fitted. The stopper 27c is fitted into the notch portion 2c, and an exposed surface 27g is disposed so as to be exposed in the radial direction, so that the outer ring 27 is fixed to prevent the rotation (the rotation is restricted).

One or more notch portions 2c may be formed in the circumferential wall 2a. However, in the present embodiment, two notch portions 2c are formed at equal intervals in the circumferential direction (two notch portions symmetrical with respect to the center axis X at 180° intervals). That is, the same number of notch portions as the number of stoppers formed in the outer ring may be provided. As a result, the one-way clutch is stably held without rattling.

An outer surface of the stopper 27c is exposed in the radial direction at the notch portion 2c of the cylindrical portion 2C, and can be pinched with a finger. For this reason, the outer ring 27 is easily pinched by the exposed stopper, and the attachment/detachment workability of the one-way clutch 20 can be improved.

In the above configuration, a diameter of the circumferential wall 2a of the cylindrical portion 2C (a diameter of the outer circumferential surface of the circumferential wall) and an outermost diameter of the outer ring 27 (a diameter of the exposed surface 27g of the stopper 27c) are the same. In this case, the outer ring 27 is fitted into the circumferential wall 2a, so that the outer ring and the circumferential wall are in a non-contact state (a gap S is generated). That is, when the inner ring 21 is centered, a non-contact state is maintained between the outer ring 27 and the circumferential wall 2a, and both the members are prevented from being conducted. By disposing the outer ring 27 so as to generate the gap S as described above, a backlash can be prevented while rotational performance is secured, and miniaturization in the radial direction can be achieved. Furthermore, the attachment/detachment operation can be easily performed by providing a slight gap.

Figure 5:
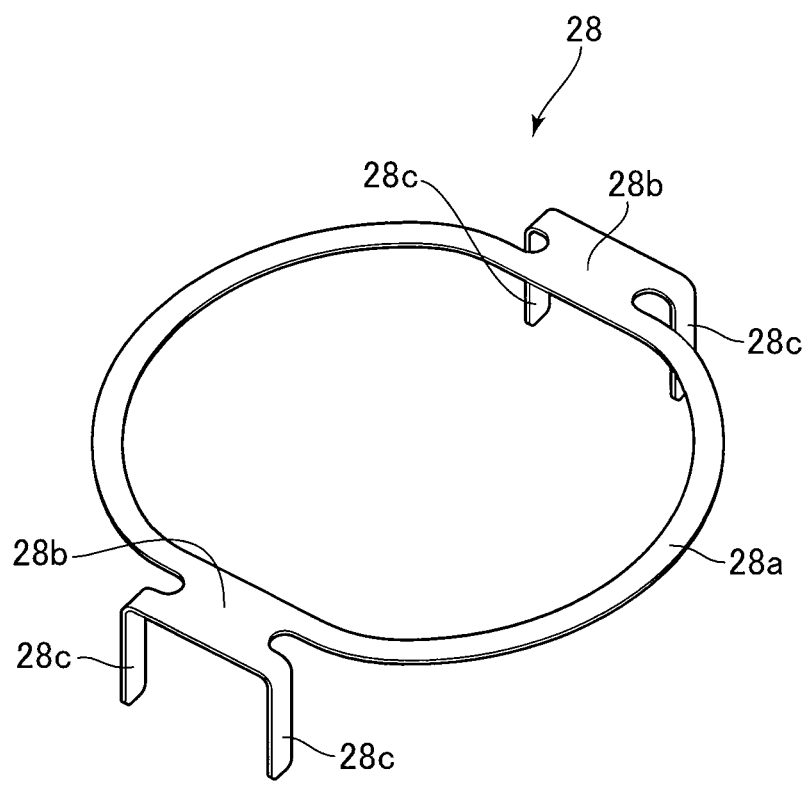
FIG. 5 is a perspective view illustrating an example of an anticorrosion plate disposed in the one-way clutch illustrated in FIG. 4.
Figure 6:
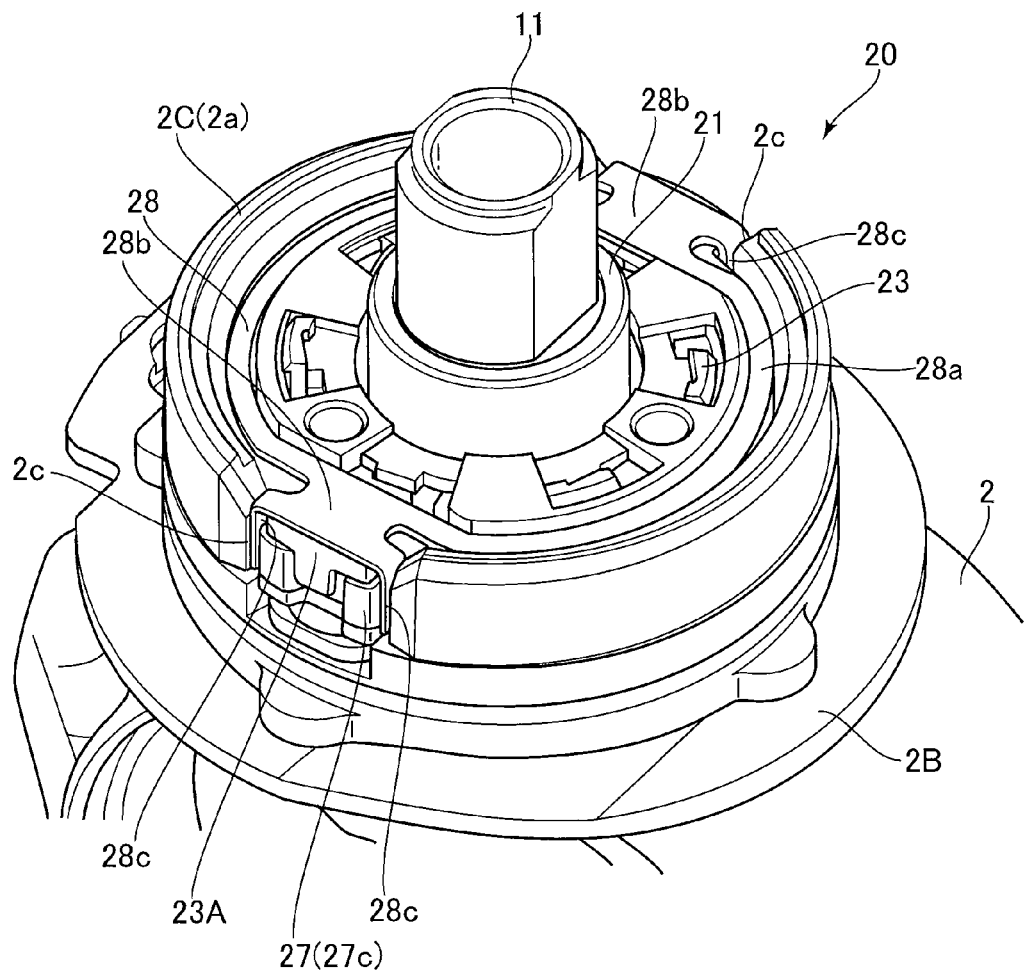
FIG. 6 is a perspective view illustrating a state in which the anticorrosion plate illustrated in FIG. 5 is disposed in the one-way clutch illustrated in FIG. 4.

In the present embodiment, a lid (cover member) 23A that covers the holder 23 and the outer ring 27 is mounted on a surface portion of the outer ring 27, and a ring-shaped electrolytic corrosion prevention plate (anticorrosion plate; also referred to as an anticorrosion member) 28 is mounted on the cover member 23A (see FIGS. 5 and 6). That is, the outer ring 27 is sandwiched between the holder 23 and the cover member 23A, and the anticorrosion plate 28 is placed on the outer peripheral side of the cover member 23A.

In general, the outer ring of the one-way clutch is disposed so as to be in contact with the cylindrical portion of the reel body. Normally, the outer ring has a structure in which a corrosion resistant film such as nickel plating is formed on SUS. For this reason, when the side of the reel body is made of alumite-treated ADC12 or a non-metallic material such as a high-strength resin material, a problem of corrosion hardly occurs between the outer ring and the reel body. However, when the reel body is formed of a magnesium-based metallic material, a potential difference between the outer ring and the reel body increases, and corrosion (electrolytic corrosion) easily occurs.

In the above configuration, since the contact portion between the outer ring 27 and the reel body 2 (cylindrical portion 2C) is the notch portion 2c and both sides 27e and 27f in the circumferential direction of the stopper 27c that abuts on the notch portion 2c, this portion may be in an insulated state. The anticorrosion plate 28 of the present embodiment is configured to be attachable and detachable from the axial direction so as to overlap the one-way clutch 20, and is configured in a plate shape and a ring shape so as not to increase the size of the reel body.

FIG. 5 is a diagram illustrating a configuration example of the anticorrosion plate.

As illustrated in FIGS. 5 and 6, the anticorrosion plate 28 of the present embodiment has a ring-shaped main body 28a that is positioned radially outside the cover member 23A and is placed on a surface portion of the cover member 23A. Protrusion pieces 28b protruding radially outward are formed on both sides in a diameter direction of the main body 28a, and a pair of leg portions 28c hanging down in the axial direction is provided on both sides of each protrusion piece 28b.

The protrusion piece 28b is formed in substantially the same shape as the stopper 27c of the outer ring 27, and the leg portion 28c is configured to be inserted between both sides 27e and 27f in the circumferential direction of the stopper 27c and the notch portion 2c, when the main body 28a is placed on the surface portion of the outer ring 27 from the axial direction.

The anticorrosion plate 28 may be made of an insulating material that is interposed (a pair of leg portions 28c is interposed) between the anticorrosion plate and both members and is not conducted. For example, when the reel body (tubular portion) is made of magnesium, it is preferable to use a material having a small potential difference with the outer ring, for example, an aluminum-based material (alumite-treated aluminum alloy). Such a material can be easily produced by press molding or the like, and is nonmagnetic. Therefore, even if the following magnetic seal mechanism is disposed, the material is not attracted to a magnet, and is not conducted by forming an alumite layer. In addition, even when a static strength test is performed, aluminum is crushed. However, since the alumite layer remains on the surface, a result is obtained in which conduction is not performed even after the static strength test. Furthermore, since the shape is stable by press molding, it is easy to perform incorporation and detachment, and rotational performance is not affected.

Of course, as a constituent material of the anticorrosion plate, an appropriate material may be selected according to the materials of the outer ring 27 and the reel body, and the anticorrosion plate may be made of other metal materials, resin materials, or the like.

A restriction plate (not illustrated in the drawings) may be separately disposed adjacent to the one-way clutch so as to restrict the axial movement of the one-way clutch 20.

The one-way clutch 20 configured as described above is unitized and incorporated in the cylindrical portion 2C. In this case, as illustrated in FIGS. 1 and 2, the magnetic seal mechanism 50 may be disposed so as to enhance waterproof and dustproof effects on the one-way clutch 20.

As known, the magnetic seal mechanism 50 comprises ring-shaped magnetic plates (electrode plates) 51 and 52 disposed with a minute gap between the magnetic plates and the outer peripheral surface of the drive shaft (inner ring 21), and a ring-shaped magnet 53 sandwiched between the magnetic plates, and has a configuration in which the gap between the drive shaft and the magnetic plate is filled with a magnetic fluid (see FIGS. 1 and 2).

In the present embodiment, a waterproof cap 60 is provided on the reel body so as to wrap the cylindrical portion 2C and the one-way clutch 20. The waterproof cap 60 has a shape including a cylindrical portion 61 surrounding the one-way clutch 20 and a cover portion 62 closing an opening on the spool side, and the magnetic plate 51 of the magnetic seal mechanism 50 is in close contact with an inner surface of the cover portion 62.

According to the one-way clutch 20 having the above-described configuration, rotation (reverse rotation) of the handle (rotor 3) in a fishing line feeding direction is prevented.

That is, when the pinion 11 is rotationally driven by rotationally operating the handle in a fishing line winding direction (rotationally driven in the clockwise direction in FIG. 3), the inner ring 21 rotates in the same direction together with the pinion 11. At this time, since the rolling member 25 held by the holder 23 moves to the free region 27b of the outer ring 27, the rotational force of the inner ring 21 is not transmitted to the outer ring 27, and the rotor 3 can rotate together with the pinion 11 without any problem.

On the other hand, when the inner ring 21 tries to rotate in the reverse direction (the rotor 3 rotates in the fishing line feeding direction) together with the pinion 11, the rolling member 25 held by the holder 23 rolls in the counterclockwise direction and is located in the wedge region 27a of the outer ring 27 by the biasing spring 24, so that the rotational force of the inner ring 21 is transmitted to the outer ring 27. Since the rotation of the outer ring 27 is restricted by the stopper 27c, reverse rotation of the pinion 11 and the rotor 3 is prevented.

In the above configuration, the notch portion 2c penetrating the circumferential wall 2a in the radial direction is formed in the circumferential wall 2a of the cylindrical portion 2C on the side of the reel body, and the stopper 27c formed in the outer ring 27 of the one-way clutch 20 is disposed in the notch portion so as to be exposed in the radial direction, so that the outer ring 27 is fixed to prevent the rotation.

That is, since the outer ring 27 is not fixed by grooves, projections, or the like formed on the inner peripheral surface of the cylindrical portion unlike a conventional case, it is possible to reduce the diameter of the cylindrical portion 2C as much as possible and reduce the thickness of the cylindrical portion 2C, and it is possible to reduce the size and weight of the reel body.

Furthermore, in the present embodiment, in the above configuration, the ring-shaped anticorrosion plate 28 is placed on the cover member, and the leg portion 28c is interposed between the outer ring 27 (the stopper 27c) of the one-way clutch and the contact portion (the notch portion 2c) of the cylindrical portion 2C, so that corrosion of the reel body can be prevented. In this case, since the anticorrosion plate 28 is accommodated in the opening of the cylindrical portion 2C, the structure around the one-way clutch is not complicated, and the entire reel can be reduced in size and weight.

In addition, since the stopper 27c of the outer ring 27 is provided symmetrically in the diameter direction, the stopper 27c can be easily pinched, and the attachment/detachment operation of the one-way clutch can be easily performed.

Further, in the present embodiment, since the magnetic seal mechanism 50 is disposed on the spool side of the one-way clutch 20 and the waterproof cap 60 is provided so as to wrap the cylindrical portion 2C and the one-way clutch 20, it is possible to prevent entry of a foreign material such as moisture and dust and to enhance durability.

Figure 7:
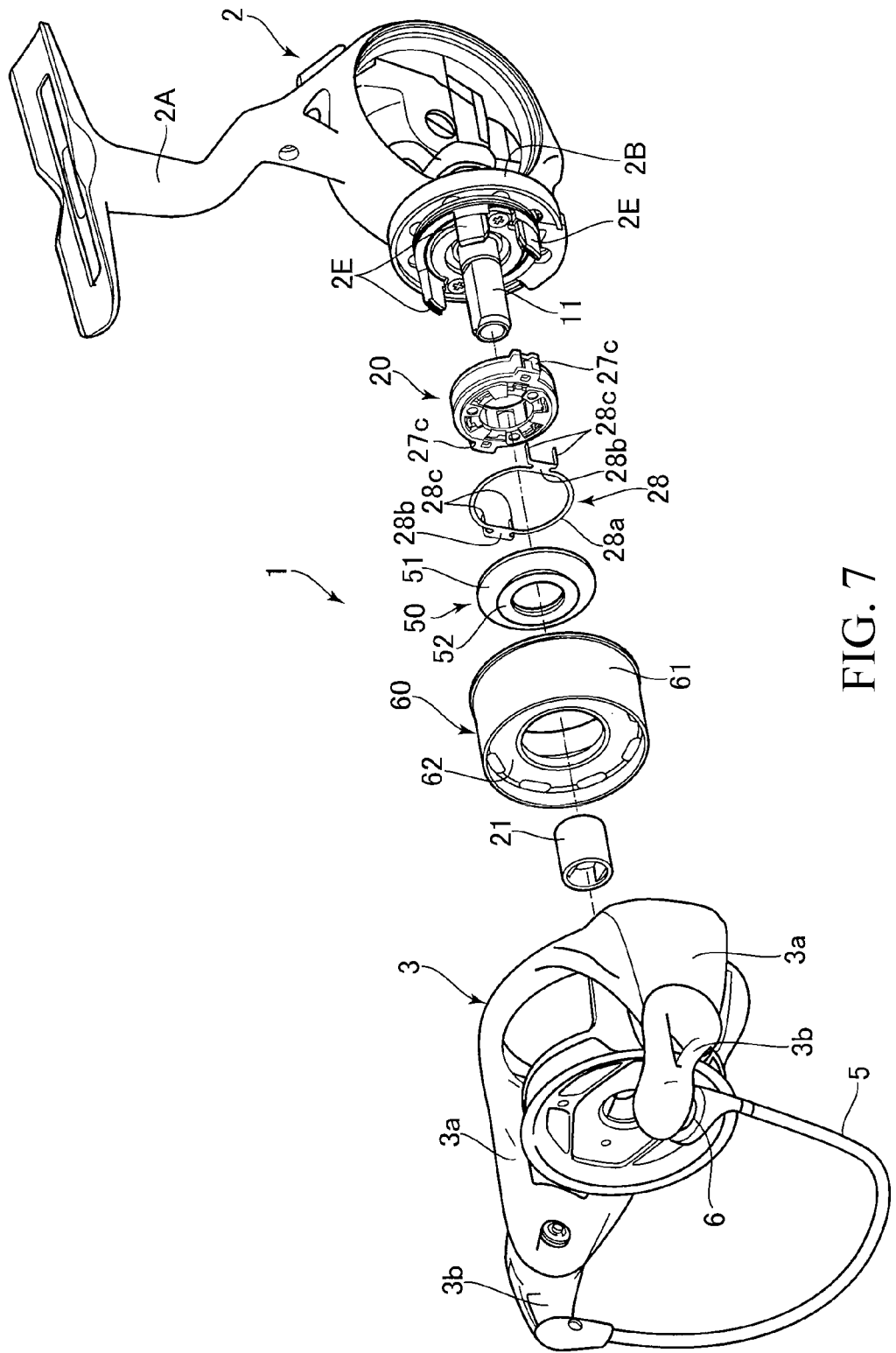
FIG. 7 is an exploded perspective view illustrating a second embodiment of the fishing reel according to the present disclosure.
Figure 8:
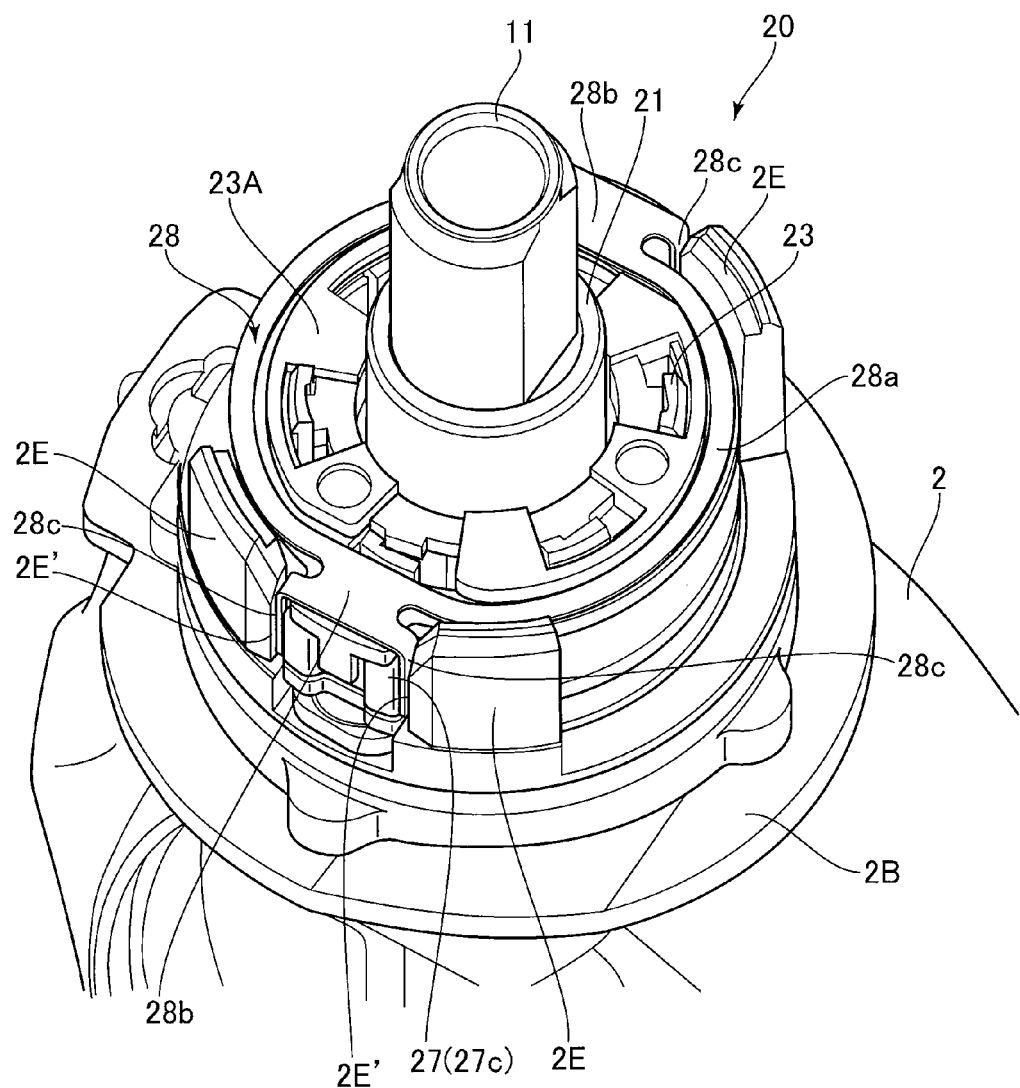
FIG. 8 is a perspective view illustrating a fixed state of a one-way clutch.

FIGS. 7 and 8 are diagrams illustrating a second embodiment of the fishing reel according to the present disclosure.

A one-way clutch 20 of the present embodiment has the same configuration as that of the first embodiment, and an outer ring 27 is provided with stoppers 27c at 180° intervals. Even in the one-way clutch of the present embodiment, similarly to the configuration illustrated in FIG. 6, a cover member 23A sandwiches the outer ring 27 together with a holder 23, and an anticorrosion plate 28 is mounted on the cover member 23A.

In the present embodiment, a reel body 2 is provided with an abutting portion 2E that abuts on the outer ring 27 at a side surface of the stopper 27c of the outer ring 27 and restricts the rotation of the outer ring 27. The abutting portion 2E is not configured in a cylindrical shape as in the first embodiment, but may have any structure as long as the abutting portion 2E protrudes in an axial direction and the side surface of the stopper 27c abuts on the abutting portion 2E to restrict the rotation. Therefore, in a case of a configuration in which one stopper is provided on the outer ring, the stopper may be provided to abut on the outer ring at two points on both sides in a circumferential direction of the stopper so as to restrict the rotation in both directions.

In the present embodiment, since the two stoppers 27c are formed at 180° intervals on the outer ring 27, the abutting portions 2E are provided on both sides in the circumferential direction of the respective stoppers, and the abutting portions 2E are configured to abut on the outer ring at two points on both sides in the circumferential direction of the respective stoppers (side surfaces 2E' of the abutting portions 2E).

According to such a configuration, similarly to the first embodiment described above, corrosion of the reel body can be prevented by the anticorrosion plate 28, the one-way clutch can be fixed to prevent rotation without providing a cylindrical portion having a notch portion, and weight reduction and size reduction can be achieved. In such a configuration, since a space is generated around the abutting portion, the one-way clutch 20 can be easily attached and detached.

Furthermore, the abutting portion 2E is preferably formed so as to abut on the outer ring 27 at two points on the radially inner side of an outermost-diameter position of the stopper 27c of the outer ring 27.

In such a configuration, since the abutting portion 2E can be thinned, the weight can be further reduced.

The anticorrosion plate 28 (see FIG. 5) of the above-described embodiment is formed of a member different from the one-way clutch, is located radially outside the cover member 23A of the holder 23, and is formed in a ring shape placed on the surface portion of the cover member 23A. However, the anticorrosion plate may be provided on a constituent member of the one-way clutch 20.

For example, an anticorrosion portion interposed between the reel body (notch portion 2c) and both sides 27e and 27f (see FIG. 3) of the stopper 27c may be attached as a separate portion to the holder 23 which is a constituent member of the one-way clutch described above. Alternatively, the anticorrosion portion may be formed integrally with the holder. In addition, a similar anticorrosion portion may be attached as a separate portion to the side of the cover member 23A of the holder, may be formed integrally with the cover member 23A, or may be provided on both the holder 23 and the cover member 23A.

By providing the anticorrosion member in the constituent element of the one-way clutch, the number of parts can be reduced, and the incorporation can be improved.

Note that the anticorrosion portion (anticorrosion member) may be configured so as not to cause electrolytic corrosion between the one-way clutch and the reel body, and its shape and material can be appropriately modified.

The embodiment according to the present disclosure has been described above. The present disclosure is not limited to the embodiment described above, and various modifications can be made.

The shape of the stopper 27c having the above-described configuration can be appropriately modified. For example, the exposed surface 27g of the stopper may or may not protrude radially from the cylindrical portion 2C in the notch portion 2c of the cylindrical portion 2C. Further, in the configuration illustrated in FIG. 8, the stopper is configured to abut on the abutting portion 2E on both sides in the circumferential direction of the stopper. However, a recessed portion may be formed along the axial direction in the center portion of the stopper, and the abutting portion may be formed so as to be fitted into the recessed portion. Alternatively, an abutting portion extending in the axial direction with a U-shaped cross section may be provided on the reel body so as to abut on both sides of the stopper 27c. In addition, the shape of the anticorrosion plate (anticorrosion member) can be appropriately modified as long as the anticorrosion plate has a configuration in which a member having an anticorrosion effect is inserted between the one-way clutch and the reel body.

In the embodiment described above, the reverse rotation of the rotor is prevented by fixing the holder 23. However, a structure may be adopted in which an operation member protruding to the outside of the reel body is provided, the rolling member is located in the free region by rotating the holder by the operation of the operation member, and the reverse rotation of the rotor is allowed.

Further, in the present embodiment, the spinning reel is exemplified as the fishing reel, but the present disclosure can also be applied to other reels (double-bearing reels) in which a one-way clutch is incorporated.

REFERENCE SIGNS LIST 1 spinning reel (fishing reel)
2 reel body
2C cylindrical portion
2c notch portion
3 rotor
20 one-way clutch
27 outer ring
27c stopper
28 anticorrosion plate

What is claimed is:

1. A fishing reel comprising:
a drive shaft that is rotationally driven by a rotation operation of a handle rotatably supported on a reel body;
a one-way clutch that is disposed on the drive shaft and has an inner ring, an outer ring, and a holder holding a plurality of rolling members; and
a cylindrical portion that is provided on the reel body and accommodates the one-way clutch,
wherein the outer ring is provided with a stopper protruding radially outward, a circumferential wall of the cylindrical portion is provided with a notch portion which penetrates the circumferential wall in a radial direction and in which the stopper is disposed, and
an anticorrosion plate comprising a leg portion interposed between the stopper and the notch portion is disposed to overlap the one-way clutch in an axial direction.

2. The fishing reel according to claim 1, wherein two or more notch portions are provided at equal intervals in a circumferential direction of the circumferential wall, and the same number of stoppers as the number of the notch portions are provided.

3. The fishing reel according to claim 1, wherein the outer ring is disposed with a gap between the outer ring and the circumferential wall of the cylindrical portion.

4. A fishing reel comprising:
a drive shaft that is rotationally driven by a rotation operation of a handle rotatably supported on a reel body; and
a one-way clutch that is disposed on the drive shaft and has an inner ring, an outer ring, and a holder holding a plurality of rolling members,
wherein the outer ring is provided with a stopper protruding radially outward, and the reel body is provided with an abutting portion that abuts on the outer ring at two points on both side surfaces of the stopper to restrict rotation of the outer ring, and
an anticorrosion plate comprising a leg portion interposed between the stopper and an abutment portion of the abutting portion is disposed to overlap the one-way clutch in an axial direction.

5. The fishing reel according to claim 4, wherein the abutting portion is provided on a radially inner side of an outermost-diameter position of the stopper.

6. The fishing reel according to claim 1, wherein the anticorrosion plate is an alumite-treated aluminum alloy.

* * * * *